(12) United States Patent
Miller et al.

(10) Patent No.: US 7,793,151 B2
(45) Date of Patent: Sep. 7, 2010

(54) DYNAMIC PARTITIONING OF EVENT PATTERNS FOR DETERMINING SYMPTOMS

(75) Inventors: Brent A. Miller, Cary, NC (US);
Denilson Nastacio, Apex, NC (US);
Marcelo Perazolo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/924,087

(22) Filed: Oct. 25, 2007

(65) Prior Publication Data
US 2009/0113242 A1 Apr. 30, 2009

(51) Int. Cl.
*G06F 11/00* (2006.01)
(52) U.S. Cl. .................. 714/26; 714/25; 714/48; 706/48
(58) Field of Classification Search .......... 714/25, 714/26, 48; 706/48
See application file for complete search history.

(56) References Cited

U.S. PATENT DOCUMENTS

| | | | |
|---|---|---|---|
| 6,532,456 B1 * | 3/2003 | Wang et al. ................ 706/48 |
| 7,100,084 B2 * | 8/2006 | Unkle et al. ................ 714/26 |
| 7,251,584 B1 * | 7/2007 | Perazolo et al. ............ 702/183 |
| 7,379,846 B1 * | 5/2008 | Williams et al. ........... 702/185 |
| 2008/0148110 A1 * | 6/2008 | Bhamidipaty et al. ...... 714/57 |
| 2008/0168308 A1 * | 7/2008 | Eberbach et al. .......... 714/26 |
| 2009/0019310 A1 * | 1/2009 | Nastacio et al. ........... 714/26 |

* cited by examiner

*Primary Examiner*—Robert Beausoliel
*Assistant Examiner*—Charles Ehne

(57) ABSTRACT

Events experienced by resources are locally processed by secondary autonomic managers into consolidated events. These consolidated events are then transmitted to a primary autonomic manager, which recognizes symptoms of conditions found in a computer system that utilizes the resources. The primary autonomic manager is thus able to leverage information in a symptom catalog to process the consolidated events to recognize such symptoms.

20 Claims, 3 Drawing Sheets

DYNAMIC PARTITIONING OF EVENT PATTERNS FOR DETERMINING SYMPTOMS

BACKGROUND OF THE INVENTION

The present invention relates in general to data processing systems and in particular to computer software. Still more particularly, the present invention relates to an improved method and system for handling resource events.

Event correlation is a method for determining symptoms that can be used in systems management, such as problem determination, self-configuration, self-optimization, etc. Typically, events and other state data are correlated with known patterns that describe a computer symptom (an indication of some situation and its respective correlation patterns and remedial actions). Examples of events are warning flags indicating a malfunction, a use of a particular resource such as a particular memory device, a data overflow, a user log-in, etc. That is, an event is any occurrence in a computer system, including hardware, software and user events. When a series of events occurs, this can be indicative of a symptom. For example, if the events of "increase in processor temperature," "Operating System interrupt," and "power surge" occur, this may be a symptom of an improper design in software that is used to manage a computer's power supply.

BRIEF SUMMARY OF THE INVENTION

Events experienced by resources are locally processed by secondary autonomic managers into consolidated events. These consolidated events are then transmitted to a primary autonomic manager, which recognizes symptoms of conditions found in a computer system that utilizes the resources. The primary autonomic manager is thus able to leverage information in a symptom catalog to process the consolidated events in order to recognize such symptoms.

DETAILED DESCRIPTION OF THE INVENTION

Figure 1:
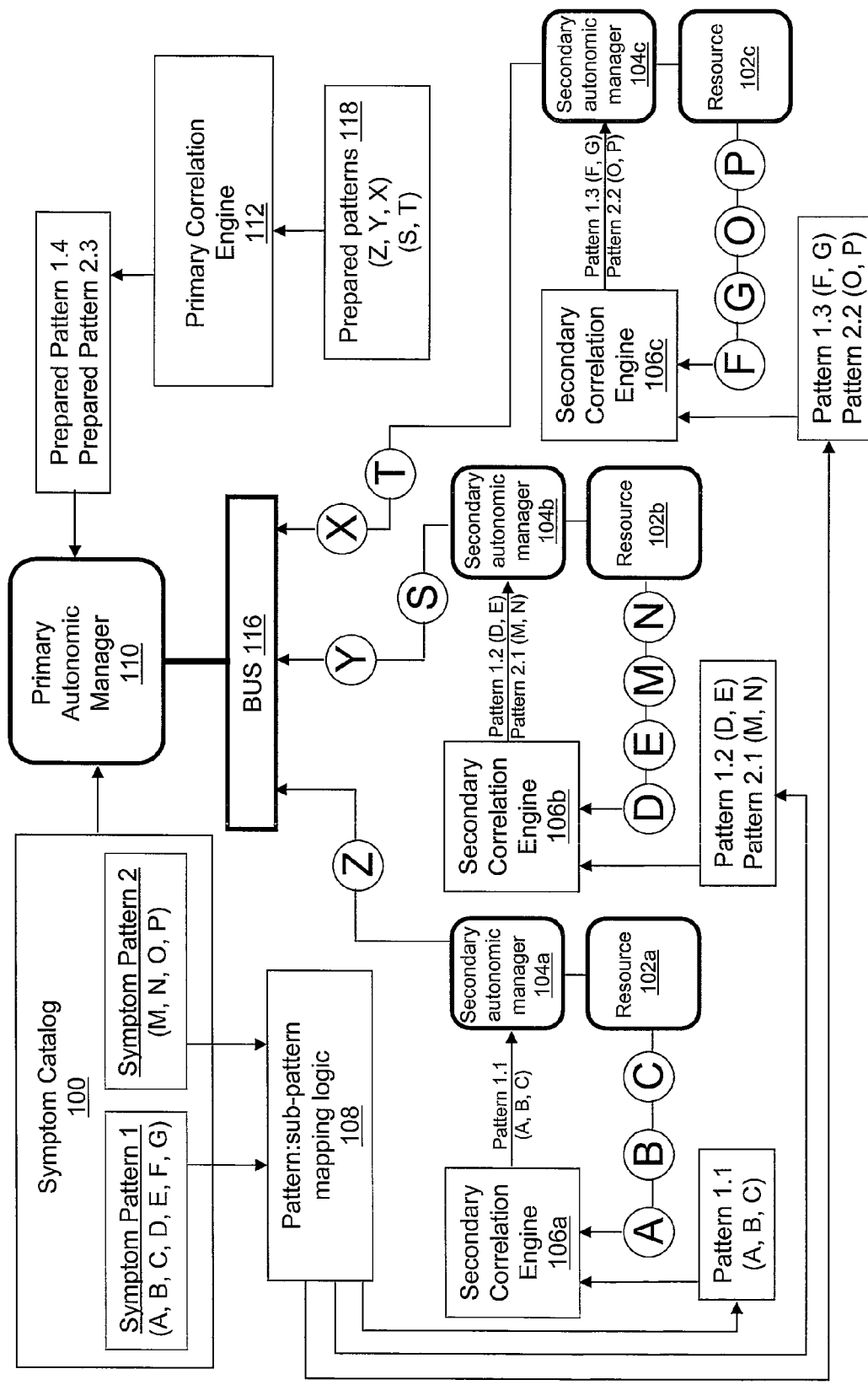
FIG. 1 depicts a novel system for pre-processing events, which are received from resources, into consolidated events.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the client's computer, partly on the client's computer, as a stand-alone software package, partly on the client's computer and partly on a remote computer or entirely on the remote computer or server. In the latter scenario, the remote computer may be connected to the client's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, a system for determining symptoms through the use of secondary autonomic managers is presented. As depicted, Symptom Patterns 1 and 2 have previously been analyzed according to event source metadata (i.e., event source metadata "A, B, C, D, E, F, G" to describe Symptom Pattern 1 and event source metadata "M, N, O, P" to describe Symptom Pattern 2) and stored in a symptom catalog 100. This analysis can be a tool-assisted pattern recognition process in which events are composed and decomposed according to common metadata from the event source. In one embodiment, this pattern recognition process for detecting symptoms is automated. As described below, the correlation of the events and/or event sequences associated with each particular resource is distributed to a local autonomic manager associated with that resource. In one embodiment, these local autonomic managers are embedded within the resources themselves, thus forming self-managing resources.

Thus, as shown in FIG. 1, each resource 102a-c is directly associated with, or else coupled to, a corresponding secondary autonomic manager 104a-c. Each of the secondary autonomic managers 104a-c has an associated secondary correlation engine 106a-c. Each of the secondary correlation engines 106a-c is able to recognize particular sub-patterns, generated by an associated resource 102a-c, through the use of a pattern:sub-pattern mapping logic 108. That is, the pattern:sub-pattern mapping logic 108 is able to partition the original patterns (e.g., those describing Symptom Pattern 1 and Symptom Pattern 2) into sub-patterns that the secondary correlation engines 106a-c are able to recognize and identify before being transmitted to a corresponding secondary autonomic manager 104a-c, which converts the sub-pattern into a consolidated event. For example, the pattern sequence "A, B, C" from the original Symptom Pattern 1 may be converted by the pattern:sub-pattern mapping logic 108 into "Z," which represents a single consolidated event made up of the events represented by "A, B, C." Assume, then, that the events "A, B, C" have been sent from resource 102a to secondary correlation engine 106a. Secondary correlation engine 106a then sends the event pattern ("A, B, C"), along with a pattern identifier 1.1, to the secondary autonomic manager 104a. Secondary autonomic manager 104a then recognizes the pattern "A, B, C" as "Pattern 1.1," which secondary autonomic manager 104a converts into a single consolidated event "Z." As discussed below, "Z" is understood by a primary autonomic manager 110 to be a consolidated event representing "A, B, C." Similarly, when the other secondary autonomic managers 104b-c send other consolidated events ("Y" representing "D, E" and "X" representing "F, G") to the primary autonomic manager 110 via a bus 116, the primary correlation engine 112 recognizes "Z, Y, X" as a Pattern 1.4, which corresponds to "Symptom Pattern 1." Note that the transmission of "Z, Y, X" instead of "A, B, C, D, E, F, G" over bus 116 greatly reduces the amount of bandwidth used over bus 116.

Similarly, when primary autonomic manager 110 receives consolidated events "S" and "T," primary correlation engine 112 recognizes "S, T" as prepared pattern 2.3, which corresponds to "Symptom Pattern 2."

Note that while the patterns described are sequential (e.g., A, B, C ... ), patterns may be non-sequential as well (e.g., C, E, G ... ).

The original symptom pattern partitioning (e.g., partitioning "Symptom Pattern 1" into events "A, B, C," "D, E," and "F, G") is accomplished by applying a partitioning algorithm to all existing rule bases. This algorithm is able to locate a given rule base/rule engine and determine the partitioning possibilities for that pattern set. In one embodiment, an intelligent algorithm/tool also adds "recommendations," such as where a new instance of a secondary correlation engine 106 for other resources might improve overall efficiency.

Thus, as described in FIG. 1, the Symptom Patterns are partitioned and distributed by the pattern:sub-pattern mapping logic 108 according to the following process. The sub-pattern 1.1, consisting of events {A, B, C} is directed to the secondary autonomic manager 104a associated with Resource 102a. The sub-pattern 1.2, consisting of events {D, E} is directed to the secondary autonomic manager 104b associated with Resource 102b. The sub-pattern 1.3, consisting of events {F, G} is directed to the secondary autonomic manager 104c associated with Resource 102c. The sub-pattern 2.1, consisting of events {M, N} is directed to the secondary autonomic manager 104b associated with Resource 102b. The sub-pattern 2.2, consisting of events {O, P} is directed to the secondary autonomic manager 104c associated with Resource 102c.

Composed events (consolidated events) are defined to represent these sub-patterns, where event Z represents the event sub-pattern {A, B, C}, event Y represents the event sub-pattern {D, E}, event X represents the event sub-pattern {F, G}, event S represents the event sub-pattern {M, N}, and event T represents the event sub-pattern {O, P}.

When occurrences (events) of interest are observed in the resources 120a-c, each of the resources 120a-c send their events to their respective local secondary autonomic managers 104a-c, which, rather than simply forwarding those events to the higher-level primary autonomic manager 110 for correlation, now use their own local instances of correlation engines to look for the pattern sub-sequences (received from pattern:sub-pattern mapping logic 108) that they have been directed to match. When a local secondary autonomic manager 104 detects a sub-sequence pattern match, it sends the consolidated event that represents that sub-sequence to the higher-level primary autonomic manager 110 for further correlation.

The higher-level primary autonomic manager 110, in turn, now needs to monitor only for the consolidated events representing the detected sub-sequence correlations from the lower-level secondary autonomic managers 104a-c. Note that the primary autonomic manager 110 may also monitor for additional, non-correlated events from the lower-level secondary autonomic managers 104a-c. In this illustration, the higher-level primary autonomic manager 110 now recognizes the sequence {Z, Y, X} as a prepared pattern 1.4 (stored in prepared patterns 118) that indicates Symptom 1, and the sequence {S, T} as a prepared pattern 2.3 that indicates Symptom 2.

Figure 2:
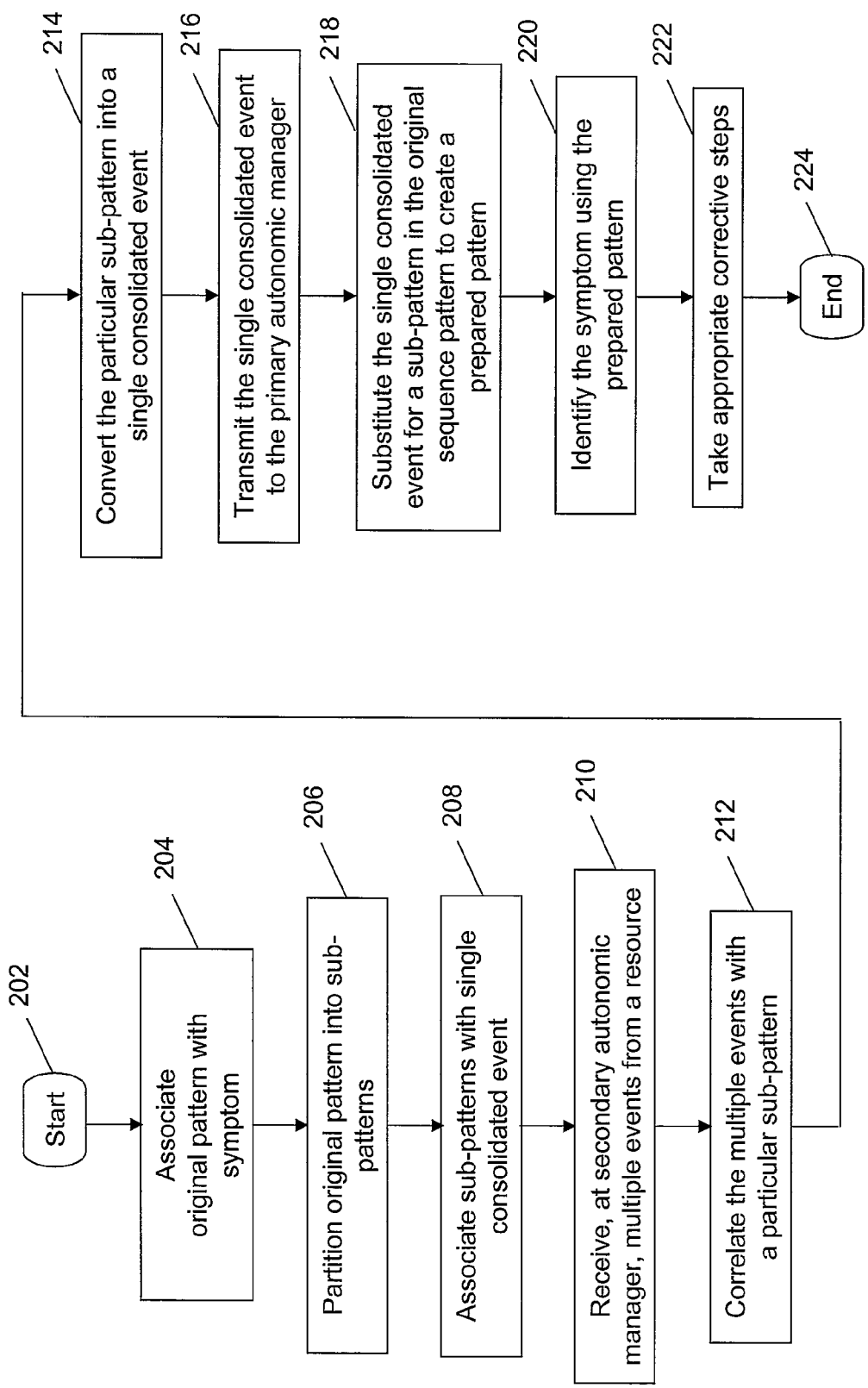
FIG. 2 is a high-level flow-chart of exemplary steps taken to identify event-correlated symptoms in a computer system.

Referring now to FIG. 2, a high-level flow-chart of exemplary steps taken by the presently disclosed process is presented. After initiator block 202, the original event pattern is associated with a symptom (block 204). The original event pattern represents multiple events, either serial or non-serial, that may occur at a resource. Examples of such events include, but are not limited to, a power spike, a software anomaly, a request for data from a hard drive, etc. That is, events are any action, nominal or anomalous, that occurs to a hardware or resource, and is represented by a representation in the sequence. The symptom is a description of a condition, either nominal or anomalous, for an entire computer system that utilizes the resources at which events occur.

The original event pattern is then partitioned into multiple sub-patterns (block 206), each of which are associated with a single consolidated event (block 208). For example, the pattern of "A, B, C", which was portioned out of the original pattern of "A, B, C, D, E, F, G", may be associated with the single consolidated event "Z". The secondary autonomic managers each receive a notice of events from their respective resources (block 210). The secondary autonomic managers then correlate these events with a particular sub-pattern (e.g., "A, B, C") (block 212), which is then converted into a single consolidated event (e.g., "Z") (block 214). These single consolidated events (e.g., "X", "Y" and "Z" are then transmitted from the secondary autonomic managers to the primary autonomic manager (block 216), which replaces the sub-pattern (e.g., "A, B, C") in the original event pattern with the single consolidated event (e.g., "Z") to create (block 218) a prepared event pattern (e.g., "Z, Y, X", "Z, D, E, F, G", etc.). Thus, "Z" may be used with other consolidated events ("Y" and "X"), or "Z" may be used with original events ("D, E, F, G") found in the original event pattern of computer events. This newly created prepared pattern (e.g., "Z, Y, X") is then utilized by the primary autonomic manager and/or primary correlation engine to identify the symptom represented by the prepared pattern, as described in block 220. Utilizing this information, corrective steps can then be taken by the computer to address the symptom, if necessary (block 222), and the process ends (terminator block 224).

Figure 3:
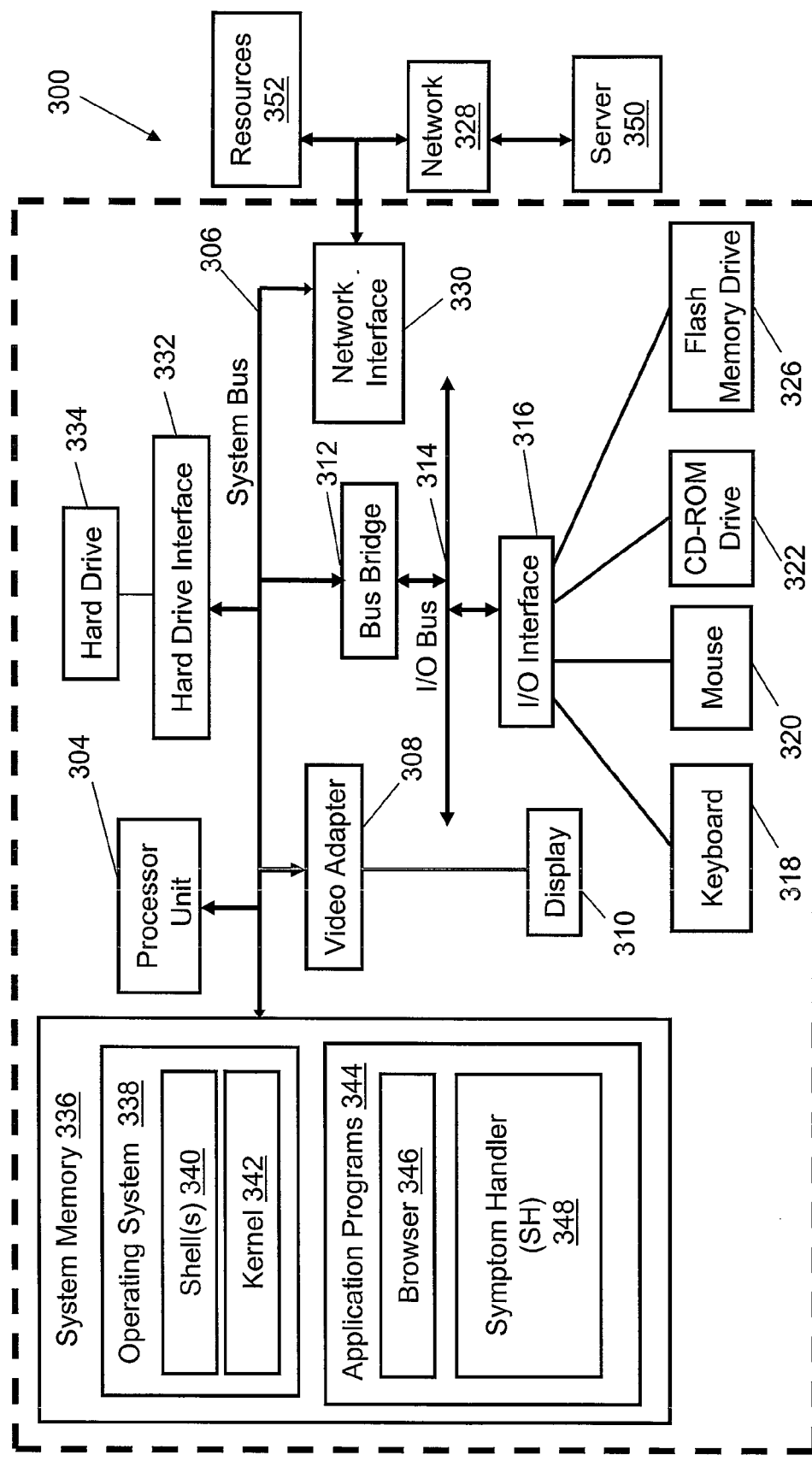
FIG. 3 illustrates an exemplary computer in which the presently disclosed process may be implemented.

With reference now to FIG. 3, there is depicted a block diagram of an exemplary computer 300, with which the present invention may be utilized. Computer 300 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, and a flash memory drive 326. The format of the ports connected to I/O interface 316 may be any known to those skilled in the art of computer architecture, including but not limited to Universal Serial Bus (USB) ports.

Computer 300 is able to communicate with a server 350 via a network 328 using a network interface 330, which is coupled to system bus 306. Network 328 may be an external network such as the Internet, or an internal network such as an Ethernet or a Virtual Private Network (VPN). Computer 300 is also coupled, via network 328, to resources 352, which are represented in FIG. 1 as resources 102a-c. Server 350, and resources 352 (when computer resources) may be architecturally configured in the manner depicted for computer 300.

A hard drive interface 332 is also coupled to system bus 306. Hard drive interface 332 interfaces with a hard drive 334. In one embodiment, hard drive 334 populates a system memory 336, which is also coupled to system bus 306. System memory 336 is defined as a lowest level of volatile memory in computer 300. This volatile memory may include additional higher levels of volatile memory (not shown), including, but not limited to, cache memory, registers, and buffers. Code that populates system memory 336 includes an operating system (OS) 338 and application programs 344.

OS 338 includes a shell 340, for providing transparent user access to resources such as application programs 344. Generally, shell 340 is a program that provides an interpreter and an interface between the user and the operating system. Shell 340 provides a system prompt, interprets commands entered by keyboard 318, mouse 320, or other user input media, and sends the interpreted command(s) to the appropriate lower levels of the operating system (e.g., kernel 342) for processing. As depicted, OS 338 also includes kernel 342, which includes lower levels of functionality for OS 338. Kernel 342 provides essential services required by other parts of OS 338 and application programs 344. The services provided by kernel 342 include memory management, process and task management, disk management, and I/O device management.

Application programs 344 include a browser 346. Browser 346 includes program modules and instructions enabling a World Wide Web (WWW) client (i.e., computer 300) to send and receive network messages to the Internet. Computer 300 may utilize HyperText Transfer Protocol (HTTP) messaging to enable communication with server 350. Application programs 344 in system memory 336 also include a Symptom Handler (SH) 348. SH 348 includes logic for performing the functions illustrated above in FIGS. 1-2. Thus, when executed within computer 300, SH 348 includes, but is not limited to, logic for primary autonomic manager 110, symptom catalog 101, pattern:sub-pattern mapping logic 108, and primary correlation engine 112 (shown in FIG. 1). When executed in, or in association with, resources 102, SH 348 includes, but is not limited to, logic for secondary autonomic manager 104 and secondary correlation engines 106 (shown in FIG. 1).

In one embodiment, computer 300 is able to download SH 348 from service provider server 350, including in an "on demand" basis. In another embodiment, service provider server 350 performs all of the functions associated with the present invention (including execution of SH 348), thus freeing computer 300 from using its own resources.

The hardware elements depicted in computer 300 are not intended to be exhaustive, but rather represent and/or highlight certain components that may be utilized to practice the present invention. For instance, computer 300 may include alternate memory storage devices such as magnetic cassettes, Digital Versatile Disks (DVDs), Bernoulli cartridges, and the like. These and other variations are intended to be within the spirit and scope of the present invention.

As described herein, a higher-level autonomic manager's correlation engine (e.g., primary correlation engine 112 shown in FIG. 1) must monitor only for five events (Z, Y, X, S, T) rather than for all 11 possible events (A, B, C, D, E, F, G, M, N, O, P) to match against two different patterns. The first pattern (Z, Y, X) is a sequence of only three events (rather than seven events), and the second pattern (S, T) is a sequence only two events (rather than four events). The higher-level autonomic manager can use fewer resources (CPU, memory, etc.) to perform its correlation function, or it can monitor for more patterns with the same amount of resources it originally used. Overall event traffic in the system is reduced, including bus traffic over bus 116 shown in FIG. 1, because events are correlated closer to their source and only the event representing the matched correlation is forwarded to higher-level autonomic managers.

It can be seen that this is only a simple, minimal illustration and that the invention can be composed to multiples of resources, events, patterns and levels beyond those of the illustration; and that the benefits of the invention correspondingly multiply as the invention is repeatedly applied throughout the system. Moreover, this invention may apply beyond event sequences, to other event patterns, including event collections (unordered sets of events) and other patterns.

The present invention thus distributes correlation according to intelligent, dynamic partitioning of sequence patterns from a symptom catalog so that the correlation operations can be distributed and overall systems management performance increased. Sub-patterns and/or sub-sequences of correlation patterns can be pushed down to subordinate autonomic managers that perform a portion of the correlation and indicate pattern matches to higher-level autonomic managers, which can then perform the remainder (or a further portion of) the correlation. For example, suppose that a particular symptom specifies a sequence pattern of {A,B,C,D,E,F,G}. If the parsing of the symptom indicates that {A, B, C} are always events from the same source, one could create a sequence pattern {Z, D, E, F, G}, where {Z}={A, B, C} and then push down the detection of {A, B, C} to the subordinate autonomic manager that manages the event source that can emit the pattern {A, B, C}. This lower-level autonomic manager (which might be embodied as a self-managing resource) can then perform its own correlation, using its own correlation engine. When the lower-level autonomic manager detects a match of the pattern {A, B, C}, it performs the associated action of sending an event {Z} to the higher-level autonomic manager, which in turn performs further correlation. Thus, the higher-level autonomic manager needs only to monitor and look for pattern matches for the remaining event sequence {D, E, F, G}, when connected with the already partially correlated lower-level event {Z}.

Note also that the correlation for a particular symptom can be distributed across multiple correlation engines in different parts of an infrastructure. Hence, any single correlation engine is concerned with fewer events (or other state data) and fewer patterns to match against, which in turn reduces the amount of state data that the correlation engine must keep track of (and correspondingly, reduces the resources used by any particular instance of the correlation engine). This reduces the amount of event information that needs to flow between resources and autonomic managers.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying event-correlated symptoms in a computer system, the method comprising:
    associating an original pattern of computer events with a symptom of a computer system;
    partitioning the original pattern of computer events into multiple sub-patterns;
    associating at least one of the multiple sub-patterns with a single consolidated event;
    receiving, at a secondary autonomic manager, multiple events from a resource;
    correlating, at the secondary autonomic manager, the multiple events received at the secondary autonomic manager with a particular sub-pattern that describes the single consolidated event;
    converting, at the secondary autonomic manager, the particular sub-pattern into the single consolidated event;
    transmitting the single consolidated event from the secondary autonomic manager to a primary autonomic manager, wherein the single consolidated event is transmitted on a bus that couples the secondary autonomic manager to the primary autonomic manager;
    replacing, at the primary autonomic manager, the particular sub-pattern in the original pattern with the single consolidated event to create a prepared pattern; and
    utilizing, at the primary autonomic manager, the prepared pattern to identify the symptom.

2. The method of claim 1, wherein the resource is a hardware resource in the computer system.

3. The method of claim 1, wherein the resource is a software resource in the computer system.

4. The method of claim 1, wherein the symptom describes an anomaly in the computer system.

5. The method of claim 4, further comprising:
    generating a corrective response to the anomaly.

6. The method of claim 1, wherein all sub-patterns are composed of multiple resource events.

7. A system comprising:
    a processor;
    a data bus coupled to the processor;
    a memory coupled to the data bus; and
    a computer-usable medium embodying computer program code, the computer program code comprising instructions executable by the processor and configured for identifying event-correlated symptoms in a computer system by performing the steps of:
        associating an original pattern of computer events with a symptom of a computer system;

partitioning the original pattern of computer events into multiple sub-patterns;

associating at least one of the multiple sub-patterns with a single consolidated event;

receiving, at a secondary autonomic manager, multiple events from a resource;

correlating, at the secondary autonomic manager, the multiple events received at the secondary autonomic manager with a particular sub-pattern that describes the single consolidated event;

converting, at the secondary autonomic manager, the particular sub-pattern into the single consolidated event;

transmitting the single consolidated event from the secondary autonomic manager to a primary autonomic manager, wherein the single consolidated event is transmitted on a bus that couples the secondary autonomic manager to the primary autonomic manager;

replacing, at the primary autonomic manager, the particular sub-pattern in the original pattern with the single consolidated event to create a prepared pattern; and utilizing, at the primary autonomic manager, the prepared pattern to identify the symptom.

8. The system of claim 7, wherein the resource is a hardware resource in the computer system.

9. The system of claim 7, wherein the resource is a software resource in the computer system.

10. The system of claim 7, wherein the symptom describes an anomaly in the computer system.

11. The system of claim 10, further comprising:

generating a corrective response to the anomaly.

12. The system of claim 7, wherein all sub-sequence patterns are composed of multiple resource events.

13. A computer program product for identifying event-correlated symptoms in computer system, the computer program product comprising:

a computer readable storage medium having computer usable program code embodied therewith, the computer usable program code comprising:

computer usable program code configured to associate an original sequence pattern of computer events with a symptom of a computer system;

computer usable program code configured to partition the original sequence pattern of computer events into multiple sub-sequence patterns;

computer usable program code configured to associate at least one of the multiple sub-sequence patterns with a single consolidated event;

computer usable program code configured to receive, at a secondary autonomic manager, multiple events from a resource;

computer usable program code configured to correlate, at the secondary autonomic manager, the multiple events received at the secondary autonomic manager with a particular sub-sequence pattern that describes the single consolidated event;

computer usable program code configured to convert, at the secondary autonomic manager, the particular sub-sequence pattern into the single consolidated event;

computer usable program code configured to transmit the single consolidated event from the secondary autonomic manager to a primary autonomic manager, wherein the single consolidated event is transmitted on a bus that couples the secondary autonomic manager to the primary autonomic manager, and wherein bandwidth on the bus is conserved by the transmission of the single consolidated event instead of the particular sub-sequence pattern;

computer usable program code configured to replace, at the primary autonomic manager, the particular sub-sequence pattern in the original sequence pattern with the single consolidated event to create a prepared sequence pattern; and utilizing, at the primary autonomic manager, the prepared sequence pattern to identify the symptom.

14. The computer program product of claim 13, wherein the resource is a hardware resource in the computer system.

15. The computer program product of claim 13, wherein the resource is a software resource in the computer system.

16. The computer program product of claim 13, wherein the symptom describes an anomaly in the computer system.

17. The computer program product of claim 16, wherein the computer usable program code further comprises:

computer usable program code configured to generating a corrective response to the anomaly.

18. The computer program product of claim 13, wherein all sub-sequence patterns are composed of multiple resource events.

19. The computer program product of claim 13, wherein the computer usable medium is a component of a remote server, and wherein the computer usable program code is deployable to a local client computer from the remote server.

20. The computer program product of claim 13, wherein the computer usable program code is capable of being provided by a service provider to a customer on an on-demand basis.

* * * * *